Dec. 8, 1942.  D. H. CLEWELL  2,304,748
GRAVITY METER
Filed March 8, 1940
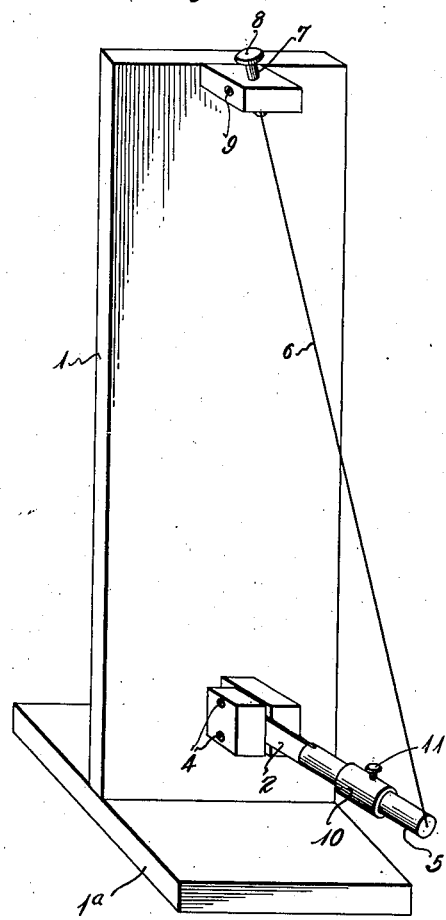
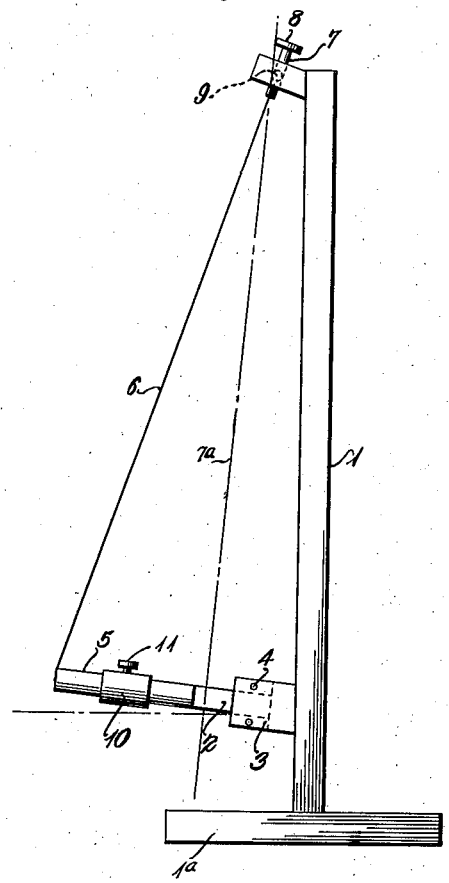
Inventor
Dayton H. Clewell
By Dallas R. Lamont
Attorney Patented Dec. 8, 1942

2,304,748

UNITED STATES PATENT OFFICE 2,304,748

GRAVITY METER

Dayton H. Clewell, Dallas, Tex., assignor, by mesne assignments, to Socony-Vacuum Oil Company, Incorporated, New York, N. Y., a corporation of New York Application March 8, 1940, Serial No. 322,893

4 Claims. (Cl. 265—1.4)

This invention relates to an instrument for determining the relative gravitational force exerted by the earth at various locations and particularly to a gravity meter of the type that can be readily transported from one place to another for the purpose of determining this factor in connection with or for the purpose of geophysical prospecting.

It has long been known that slight variations in the earth's attraction at various locations exist and that these slight variations are traceable to variations in the nature of the earth's formations underlying the various locations. This fact makes it possible to obtain information about these geological formations by accurately ascertaining the gravitational force exerted by the earth at different locations and many types of gravity meters have been used or proposed for use for determining gravity for this purpose.

It is essential in any device of this type that it be rugged in construction so that it can be transported easily and under difficult conditions and can be quickly and easily put into operation at the desired location without long and tedious work in putting it in operation and calibrating it at each new location.

According to the present invention a very simple device is provided which is so rugged and so simple that it easily withstands the hardships of transportation without losing its calibration, is quickly and easily put into operation at any desired location and yet will give very accurate indications of the relative gravitational force exerted at the various locations where determinations are made.

The new device consists basically of a pivoted mass upon which the force of gravity is to act. One end of the mass is pivotally supported by means of a leaf spring and the other end is supported by a filament. By applying tension and torsion to the filament the mass is caused to rotate through a path which substantially defines a plane through the axis of the mass that forms an acute angle with the horizontal. The upper end of the filament is carried by a fixed support in axial alignment therewith in such a manner that torsion can be applied to it to rotate the mass. Since the support for the upper end of the filament is vertically spaced from the pivotal point and lies substantially on the pivotal axis, theory shows that the mass can be caused to approach a point of instability at approximately 90° measured from the plane of the vertical element that is secured to the base and determined by the physical dimensions of suspension and stiffness of the elastic members. Just before the point of instability is reached the instrument is most sensitive to variations in gravitational force. Therefore, it is desirable to operate the instrument as near the point of instability as possible. Due to the fact that the support for the upper end of the filament is back of the pivot point, the application of torsional forces to the filament will lift the mass while rotating it to the point of instability.

A more complete understanding of the principles of this invention may be obtained from a consideration of the following detailed description of a preferred embodiment thereof as illustrated by the accompanying drawing wherein:

Figure 1 is a perspective view of one form of gravity meter constructed according to the principles of this invention and which form has been found to have especially desirable characteristics; and Figure 2 is a side elevation of the device showing the position of the support for the upper end of the filament relative to the pivot point for the mass.

As illustrated this gravity meter comprises a base 1a and a frame 1 in which is adapted to be clamped a leaf spring 2 by means of a clamping block 3 and the screws 4 in such a manner that the plane of the spring is vertical. The leaf spring 2 extends outwardly and upwardly to form a small acute angle with the horizontal and carries at its upper end a bar mass 5 in axial alignment therewith. The outer end of the bar mass is supported by a filament 6 the upper end of which is supported by being attached to a carrying member 7 mounted so that it may be rotated in the main frame 1 about a pivotal axis defined by a line passing substantially through the midpoint of the leaf spring 2 and the point of attachment of the filament to the carrying member 7, and indicated in the drawings by the dash line 7a. The upper end of filament 6 is secured to and in axial alignment with member 7. Member 7 is provided with an operating handle 8 by means of which member 7 can be rotated to introduce torsional forces into the filament 6 to adjust the sensitivity of the instrument. There is provided at 9 a locking means such as a set screw that will hold the instrument in adjusted condition. Carried on the bar mass 5 is an auxiliary mass 10. This mass is mounted on the bar mass 5 so that it may be moved up and down the length of the bar to adjust its position relative to the pivot and the point where the filament 6 is attached to thereby effect a calibration of the instrument by changing the center of gravity of the entire mass and the effective lever arm through which the entire mass is acting. The auxiliary mass is provided with a set screw 11 or other locking means for holding it in any desired position.

Since the variations in gravitational force from station to station is extremely small very sensitive instruments are necessary for detecting and measuring them. This device is made extremely sensitive to these small changes in gravitational force by suspending the mass in such a manner that its center of gravity is above its pivot and the top of the filament is secured to the support at a point that is in back of the pivotal axis of the mass 5. With such an arrangement the mass will rotate through a path which substantially defines a plane that forms a small acute angle to the horizontal. When no torsional stresses are applied to the filament the mass will therefore seek its lowest level. Starting from this point the sensitivity of the device is adjusted by rotating the member 7 to apply torsional stress to the filament 6. By setting up sufficient stresses in the filament 6 the mass can be caused to rotate about its pivot to a point such as is illustrated in Figure 1. The mass has thus been raised to a point approaching its maximum elevation where further application of the torsional force to the filament 6 will cause the mass to kick over and fall off on the opposite side. The point of unstable equilibrium is therefore at an angle of substantially 90° to the vertical plane of the frame 1.

When the mass has been caused to rotate to a point just under the position of unstable equilibrium it is most sensitive to small changes in gravitational force acting upon it. The operating range for the instrument therefore is just below the point of unstable equilibrium. In this position or range greatest displacement of the mass for small forces can be effected.

By keeping the angle between the bar mass 5 and the horizontal as small as is practical to still keep the center of gravity of the mass above the pivot point the instrument's sensitivity can be obtained with very small stresses in the elastic members.

Any desired type of optical system or other means for accurately ascertaining the position of the mass may be used with the gravity meter here shown but this part of the gravity meter has not been illustrated because it is only an adjunct to, and not a part of, the present invention. Further, magnetic, electrostatic or other means may be used to null the displacement of the mass and return it to the base position and the reading may be obtained by a determination of the amount of force required to return the mass to the zero or base position each time a determination is made. Still further, clamps may be provided for holding the mass in a base or fixed position while the device is being transported and means may be provided for maintaining the temperature of the meter constant and for holding it in a level position and guarding it from vibration. All these are details that are contemplated as likely to be applied to this gravity meter in use but are not, obviously, essential to the present invention.

Many other detailed features that may be added as refinement to the gravity meter illustrated will immediately be apparent to those skilled in the art, and it is to be understood that the scope of this invention includes the principles of this invention regardless of whether or not these numerous additional features are incorporated.

I claim:

1. A gravity meter comprising a support, a bar mass, means pivotally connecting said mass to the support for rotation in a plane that makes an acute angle to the horizontal, said means extending outwardly from the support in such a manner that the center of gravity of the mass is above the pivot point, a filament having its upper end rotatably secured to the support at a point substantially on the pivotal axis of rotation of the mass and its bottom end secured to the free end of the mass, and means for rotating the upper end of the filament to set up torsional stresses in it to rotate and elevate the mass to adjust its sensitivity.

2. A gravity meter comprising a support, a bar mass, pivotal means connecting said mass to the support for rotation in a plane that makes an acute angle to the horizontal, a filament having its upper end rotatably secured to the support at a point lying substantially on the pivotal axis of rotation of the mass and its lower end secured to and adapted to support the free end of the mass in such a manner that its center of gravity is above the pivot point, means carried by the bar mass for changing its center of gravity to effect a change in the sensitivity of the device to vertical components of gravitational force.

3. A gravity meter comprising a support, a bar mass, pivotal means connecting one end of said bar mass to the support in such a manner that the axis of the mass can pivot in a plane that makes an acute angle to the horizontal, a torsional element for supporting the free end of the mass having its bottom end secured to and adapted to support the free end of the mass in such a manner that its center of gravity is above the pivot point and its upper end rotatably secured to the support at a point substantially on the axis of rotation of said mass for rotation of the mass in a plane which makes an acute angle to the horizontal, and means for varying the effective lever arm through which the mass is acting to change the sensitivity of the device to the action of vertical components of gravitational force acting upon it.

4. A gravity meter comprising a support, a bar mass pivotally secured at one end to the support in such a manner that it can pivot in a plane that forms with the horizontal an acute angle, a filament secured at its bottom end to the free end of the mass and its upper end rotatably secured to the support at a point above and back of the pivot point, means for rotating the upper end of the filament to effect a rotation of the mass about its pivot to adjust the sensitivity of the device to variations of the vertical components of gravitational force, and means for varying the effective lever arm through which the mass is acting to calibrate the instrument.

DAYTON H. CLEWELL.